United States Patent
Li

(10) Patent No.: US 7,380,508 B2
(45) Date of Patent: Jun. 3, 2008

(54) SUSPENDING-RAIL PERMANENT MAGNETIC LEVITATION TRAIN SYSTEM

(76) Inventor: Lingqun Li, Tower A, Bldg., No. 14, Chuangye Yuan, Shuang D Gang, Gaoxinyuanqu, No. 12, Liaohedonglu Dalian, 116620 (CN)

( * ) Notice: Subject to any disclaimer, the term of this patent is extended or adjusted under 35 U.S.C. 154(b) by 303 days.

(21) Appl. No.: 11/373,895

(22) Filed: Mar. 13, 2006

(65) Prior Publication Data

US 2006/0219128 A1  Oct. 5, 2006

(30) Foreign Application Priority Data

Mar. 17, 2005  (CN) .................. 2005 1 0055895

(51) Int. Cl.
*B60L 13/06* (2006.01)

(52) U.S. Cl. .................. 104/284; 104/281

(58) Field of Classification Search .............. 104/123, 104/124, 281, 282, 283, 284, 285

See application file for complete search history.

(56) References Cited

U.S. PATENT DOCUMENTS

| | | | |
|---|---|---|---|
| 3,791,308 A | | 2/1974 | Hartz |
| 3,885,504 A | * | 5/1975 | Baermann .................. 104/283 |
| 3,937,148 A | * | 2/1976 | Simpson .................... 104/283 |
| 4,702,173 A | | 10/1987 | Perrott |
| 4,776,282 A | | 10/1988 | Ishikura et al. |
| 5,454,328 A | * | 10/1995 | Matsuzaki et al. .......... 104/139 |
| 5,467,718 A | | 11/1995 | Shibata et al. |
| 5,473,209 A | | 12/1995 | Lamb |

(Continued)

FOREIGN PATENT DOCUMENTS

CN  1264660A  8/2000

(Continued)

OTHER PUBLICATIONS

Photograph of levitation device provided by Magna Force, Inc., publication date unknown.

(Continued)

*Primary Examiner*—J. Allen Shriver
*Assistant Examiner*—Jason C Smith
(74) *Attorney, Agent, or Firm*—Workman Nydegger

(57) ABSTRACT

A compensation type suspending-rail permanent magnetic levitation system includes a track unit and a vehicle unit, the track unit includes a suspending arch crosstie, and balancing guide levitation rails are symmetrically disposed on two inner sides of the suspending arch crosstie. Permanent magnetic rails are disposed on upper surfaces of ends at an open side of the suspending arch crosstie and auxiliary guide rails are disposed on end surface of the ends, respectively. The vehicle unit includes a compartment and a magnetic levitation cabin. Two balancing permanent magnets of opposite magnetic poles are disposed on both outer sides of the cabin respectively, and magnetically conductive bases are provided between the balancing permanent magnets and the cabin. Guide wheels are provided between the two balancing permanent magnets on one outer side of the cabin. Wing magnet bases are mounted to upper portions at the both outer sides of the cabin and wing magnets are mounted under the wing magnet bases respectively. Sliding shoes are provided at inner sides of the wing magnet bases respectively and auxiliary guide wheels are symmetrically provided between a lower portion of the cabin and the compartment.

5 Claims, 3 Drawing Sheets

U.S. PATENT DOCUMENTS

| | | | |
|---|---|---|---|
| 5,477,093 A | 12/1995 | Lamb | |
| 5,477,094 A | 12/1995 | Lamb | |
| 5,511,488 A * | 4/1996 | Powell et al. | 104/282 |
| 5,601,027 A * | 2/1997 | Shinozaki et al. | 104/249 |
| 5,605,100 A * | 2/1997 | Morris et al. | 104/284 |
| 5,628,252 A * | 5/1997 | Kuznetsov | 104/284 |
| 5,649,489 A * | 7/1997 | Powell et al. | 104/282 |
| 5,666,883 A * | 9/1997 | Kuznetsov | 104/281 |
| 5,668,424 A | 9/1997 | Lamb | |
| 5,691,587 A | 11/1997 | Lamb | |
| 5,712,519 A | 1/1998 | Lamb | |
| 5,712,520 A | 1/1998 | Lamb | |
| 5,739,627 A | 4/1998 | Lamb | |
| 5,778,796 A | 7/1998 | Kim | |
| 5,834,872 A | 11/1998 | Lamb | |
| 5,880,548 A | 3/1999 | Lamb | |
| 5,903,075 A | 5/1999 | Lamb | |
| 5,909,073 A | 6/1999 | Lamb | |
| 5,934,198 A * | 8/1999 | Fraser | 105/144 |
| 5,992,575 A | 11/1999 | Kim | |
| 6,005,317 A | 12/1999 | Lamb | |
| 6,043,578 A | 3/2000 | Lamb | |
| 6,072,258 A | 6/2000 | Lamb | |
| 6,095,054 A | 8/2000 | Kawano et al. | |
| 6,178,892 B1 * | 1/2001 | Harding | 104/155 |
| 6,240,852 B1 | 6/2001 | Camp | |
| 6,242,832 B1 | 6/2001 | Lamb | |
| 6,337,527 B2 | 1/2002 | Lamb | |
| 6,357,359 B1 * | 3/2002 | Davey et al. | 104/282 |
| 6,361,268 B1 * | 3/2002 | Pelrine et al. | 414/749.2 |
| 6,450,103 B2 * | 9/2002 | Svensson | 104/120 |
| 6,510,799 B2 | 1/2003 | Lamb et al. | |
| 6,543,591 B2 | 4/2003 | Kuzuya | |
| 6,644,208 B2 | 11/2003 | Akiyama | |
| 6,827,022 B2 * | 12/2004 | van den Bergh et al. | 104/284 |
| 6,899,036 B2 | 5/2005 | Lamb et al. | |
| 6,925,941 B2 * | 8/2005 | Bengoa Saez De Cortazar | 104/123 |
| 6,983,701 B2 * | 1/2006 | Thornton et al. | 104/282 |
| 7,134,396 B2 * | 11/2006 | Ramu | 105/49 |
| 7,204,192 B2 | 4/2007 | Lamb et al. | |
| 7,243,604 B2 * | 7/2007 | Li | 104/139 |
| 7,314,008 B2 * | 1/2008 | Li | 104/281 |
| 2003/0084115 A1 | 5/2003 | Wood et al. | |
| 2003/0205163 A1 | 11/2003 | Lamb et al. | |
| 2004/0119358 A1 * | 6/2004 | Thornton et al. | 310/180 |
| 2004/0182275 A1 * | 9/2004 | Frank et al. | 104/286 |
| 2005/0034628 A1 | 2/2005 | Lamb et al. | |
| 2005/0223934 A1 | 10/2005 | Li | |
| 2005/0252407 A1 | 11/2005 | Li | |
| 2006/0219128 A1 * | 10/2006 | Li | 104/284 |
| 2006/0236890 A1 | 10/2006 | Lamb et al. | |
| 2006/0243157 A1 * | 11/2006 | Li | 104/281 |
| 2006/0244322 A1 | 11/2006 | Li | |
| 2007/0044677 A1 | 3/2007 | Li | |
| 2007/0089636 A1 * | 4/2007 | Guardo, Jr. | 104/281 |

FOREIGN PATENT DOCUMENTS

| | | |
|---|---|---|
| CN | 1490207 A | 4/2004 |
| CN | 1746046 A | 3/2006 |

OTHER PUBLICATIONS

Qingchao Wei et al., *Magnetic Levitation Railway System and Technique*, China Science and Technology Publishing Company, pp. 19 and 23, Nov. 2003 (with partial English translation).

* cited by examiner

SUSPENDING-RAIL PERMANENT MAGNETIC LEVITATION TRAIN SYSTEM

CROSS-REFERENCE TO RELATED APPLICATIONS

This application claims priority to Chinese Application Ser. No. 200510055895.X, filed Mar. 17, 2005, which application is hereby incorporated by reference.

BACKGROUND OF THE INVENTION

1. The Field of the Invention

The present invention relates to a suspending type permanent magnetic levitation system, and more particularly, to a suspending-rail permanent magnetic levitation system in which the track is elevated and the vehicle unit is traveled under the elevated track.

2. The Relevant Technology

One core technique of the magnetic levitation train is directed to the magnetic levitation system. For example, the German TR serial levitation train employs a gap-sensing electromagnetic attraction levitation technique, the Japan MLX serial levitation train employs a super-conductive electromotive levitation technique, and the China GK06 serial train employs a compensation type permanent magnet levitation technique.

The levitation systems employed by German TR serial levitation train and Japan MLX serial levitation train have the same disadvantages, that is, the manufacturing and control cost is high, the levitation capability is low, the energy consumption is high, the resource expenditure is high, and the stability of the levitation operation is poor. With comparison to the German TR serial levitation train and Japan MLX serial levitation train, the compensation type permanent magnet levitation system employed in China GK06 serial train reduces the manufacturing cost, increases the levitation capability, saves energy and resource, however it has the following great disadvantages:

(1) the magnetic energy compensation is dispersive;

(2) the manufacturing cost is increased because a lot of NdFeB material is used;

(3) it is difficult to control the relatively small gaps between the vehicle unit and the track and the running resistance is great.

The above-mentioned levitation techniques are referred to "Magnetic Levitation Railway System and Technique" (China Science and Technology Publishing Company, published on November, 2003) and the Chinese Patent Publication No. CN1264660A entitled "tube vacuum permanent magnetic compensation type levitation train-elevated railway-station system".

SUMMARY OF THE INVENTION

One aspect of the present invention relates to a compensation type permanent magnetic levitation system. With the present invention, the magnetic levitation train can be increased in the levitation capability, run stably and be decreased in manufacturing cost.

One embodiment of the present invention provides a permanent magnetic levitation system, comprising:

a track unit including:

a beam used as a base, a suspending arch crosstie connected fixedly to a bottom of the beam and having first and second ends at an open side thereof, first and second balancing guide levitation rails which are disposed symmetrically in waist portions at inner sides of the suspending arch crosstie, made of ferromagnetic materials, and have a concave cross-section, respectively, first and second permanent magnetic rails which are disposed on upper surfaces of the first and second ends of the suspending arch crosstie respectively, and first and second auxiliary guide rails which are disposed on end surfaces of the first and second ends of the suspending arch crosstie respectively, the end surface of the first end facing that of the second end; and a vehicle unit including:

a compartment, a magnetic levitation cabin which is integrated with the compartment, has first and second outer sides opposed to each other, and is formed with first and second protrusion portions at the first and second outer sides respectively, first and second magnetically conductive bases which are fixed to outer sides of the first and second protrusion portions respectively, first and second pairs of balancing permanent magnets which are symmetrical, the first pair of balancing permanent magnets being fixed to the first magnetically conductive base and comprised of a first lower balancing permanent magnet and a first upper balancing permanent magnet located above the first lower balancing permanent magnet, the first lower and upper balancing permanent magnets having opposite magnetic poles to each other, and the second pair of balancing permanent magnets being fixed to the second magnetically conductive base and comprised of a second lower balancing permanent magnet and a second upper balancing permanent magnet located above the second lower balancing permanent magnet, the second lower and upper balancing permanent magnets having opposite magnetic poles to each other, first and second guide wheels, the first guide wheel being disposed between the first lower and upper balancing permanent magnets, and the second guide wheel being disposed between the second lower and upper balancing permanent magnets, first and second wing magnet bases which are disposed respectively on bottom surfaces of the first and second protrusion portions, first and second wing magnets which are disposed respectively on bottom surfaces of the first and second wing magnet bases, first and second sliding shoes, the first sliding shoe being disposed between the first wing magnet base, first wing magnet and the first outer side of the magnetic levitation cabin, and the second sliding shoe being disposed between the second wing magnet base, second wing magnet and the second outer side of the magnetic levitation cabin, and first and second auxiliary guide wheels which are symmetrically disposed between a lower portion of the magnetic levitation cabin and the compartment, wherein the magnetic levitation cabin is levitated in the suspending arch crosstie, the first pair of balancing permanent magnets correspond to the first balancing guide levitation rail and are spaced a gap of approximate 5 to 60 mm apart from the first balancing guide levitation rail, and the second pair of balancing permanent magnets correspond to the second balancing guide levitation rail and are spaced a gap of approximate 5 to 60 mm apart from the second balancing guide levitation rail, the first wing magnet corresponds to, and is located above and spaced a gap of approximate 2 to 60 mm apart from the first permanent magnetic rail, and the second wing magnet corresponds to, and is located above and spaced a gap of approximate 2 to 60 mm apart from the second permanent magnetic rail, the first and second guide wheels are respectively supported in concave portions of the first and second balancing guide levitation rails so as to control the vehicle unit to be positioned centrally in the suspending arch crosstie, the first and second auxiliary guide wheels correspond to and are spaced a gap of approximate 2 to 10 mm apart from the first and second auxiliary guide rails, respectively, thereby the vehicle unit is held in a levitation state at a balancing position by levitation repulsion forces generated respectively between the first and second wing magnets and the first and second permanent magnetic rails, and balancing attraction forces generated respectively between the first and second pairs of balancing permanent magnets and the first and second balancing guide levitation rails.

Preferably, the first and second balancing guide levitation rails are respectively provided with reinforcing ribs at back surfaces thereof so as to reinforce the their connections with the suspending arch crosstie.

Further, when the gaps between the first wing magnet and the first permanent magnetic rail and/or between the second wing magnet and the second permanent magnetic rail is less than 2 mm, the first sliding shoe contacts the first auxiliary guide wheel and/or the second sliding shoe contacts the second auxiliary guide wheel so as to prevent damage to the first and/or the second wing magnets and the first and/or the second permanent magnetic rails.

Preferably, during swerving of the vehicle unit, the first auxiliary guide wheel contacts first the auxiliary guide rail or the second auxiliary guide wheel contacts second the auxiliary guide rail so as to reduce the running resistance and secure travel safety.

Preferably, the first and second pairs of balancing permanent magnets, the first and second wing magnets and the first and second permanent magnetic rails are made of NdFeB permanent magnetic material, respectively.

The operating principle of the balancing compensation type suspending-rail permanent magnetic levitation system according to embodiments of present invention is described as follows.

When the balancing permanent magnets are equal in level to the balancing guide levitation rails, attraction forces generated between them in the vertical direction are zero. When the balancing permanent magnets are lower in level than the balancing guide levitation rails, upward attraction forces are generated between them so as to act on the magnetic levitation cabin, the direction of the upward attraction forces is same as that of the repulsion forces generated between the wing magnets and the permanent magnetic rails, so that the upward attraction forces and the repulsion forces form a composite force acting on the magnetic levitation cabin in an upward direction. When the weight of the vehicle unit is increased, the attraction forces and the repulsion forces are increased simultaneously. When the balancing permanent magnets are higher in level than the balancing guide levitation rails due to accidental cause during running of the vehicle unit, downward pulling forces are generated, the direction of the downward pulling forces is contrary to that of the repulsion forces, so that the vehicle unit is caused to descend to the normal level (balancing position).

With the present invention, the vehicle unit is held in a levitation state under dual action of the levitation repulsion forces and the upward or downward balancing attraction forces during running or stop of the vehicle unit. In addition, the guide wheels contact the corresponding balancing guide levitation rails so as to control the vehicle unit to be positioned centrally between the first and second balancing guide levitation rails.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Embodiments of the present invention will be described in detail with reference to the accompany drawings, the embodiments described herein are explanatory and illustrative and can not be construed to limit the present invention.

Figure 1:
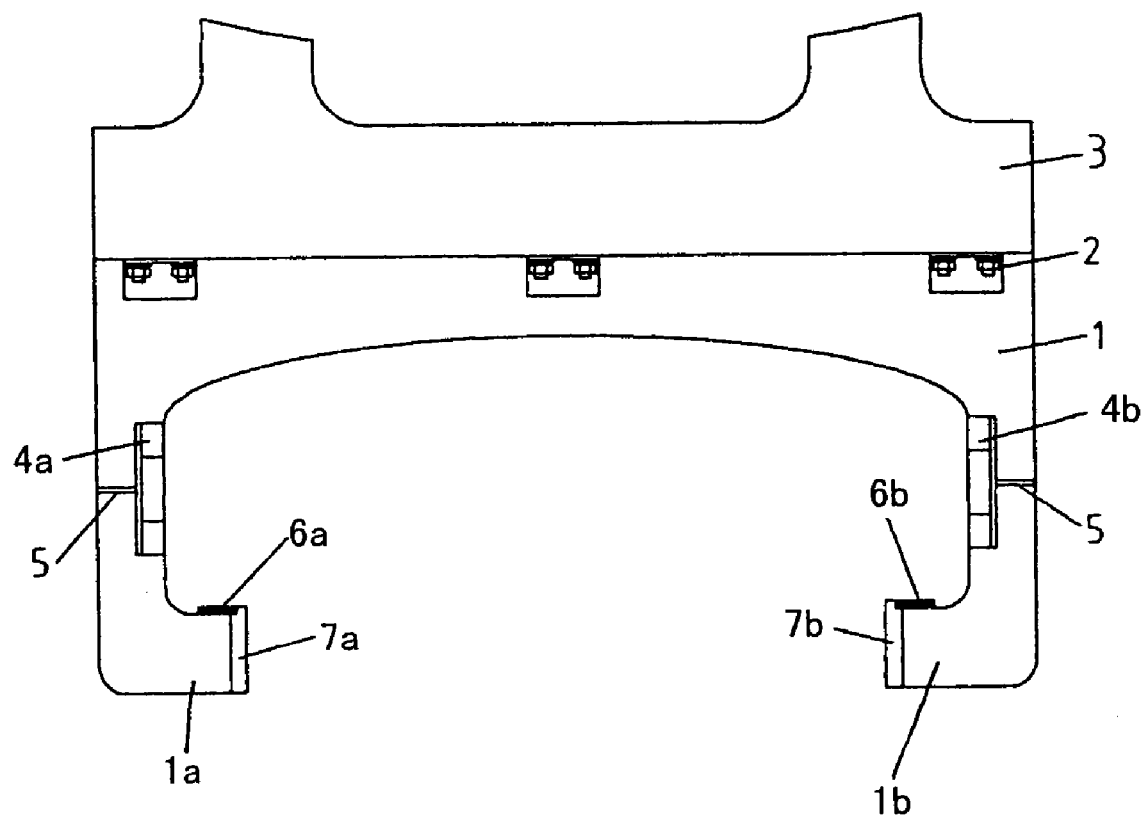
FIG. 1 is a schematic section view of the suspending arch crosstie according to an embodiment of the present invention.

FIG. 1 is a schematic section view of the suspending arch crosstie according to an embodiment of the present invention in which constitution of the track unit is shown. The track unit comprises a suspending arch crosstie 1 which is connected fixedly to a reinforced concrete beam 3 through a fastening member such as bolt 2. The suspending arch crosstie 1 has an open side (lower side in FIG. 1), as shown in FIG. 1, the suspending arch crosstie 1 has a first end 1a and a second end 1b at the open side. A first balancing guide levitation rail 4a is disposed in a waist portion of one inner side of the suspending arch crosstie 1, and a second balancing guide levitation rail 4b is disposed in a waist portion of the other inner side of the suspending arch crosstie 1 and symmetrical with the first balancing guide levitation rail 4a. The first and second balancing guide levitation rails 4a, 4b each have a concave cross-section and are provided with reinforced ribs 5 at back surfaces thereof and made of ferromagnetic materials. First and second permanent magnetic rails 6a and 6b are disposed on upper surfaces of the first and second ends 1a and 1b of the suspending arch crosstie 1 respectively, and first and second auxiliary guide rails 7a and 7b are disposed on end surfaces of the first and second ends 1a and 1b of the suspending arch crosstie 1 respectively wherein the end surface of the first end 1a faces that of the second end 1b. According to the present embodiment, the first and second permanent magnetic rails 6a and 6b are made of, but not limited to, NdFeb permanent magnetic materials.

Figure 2:
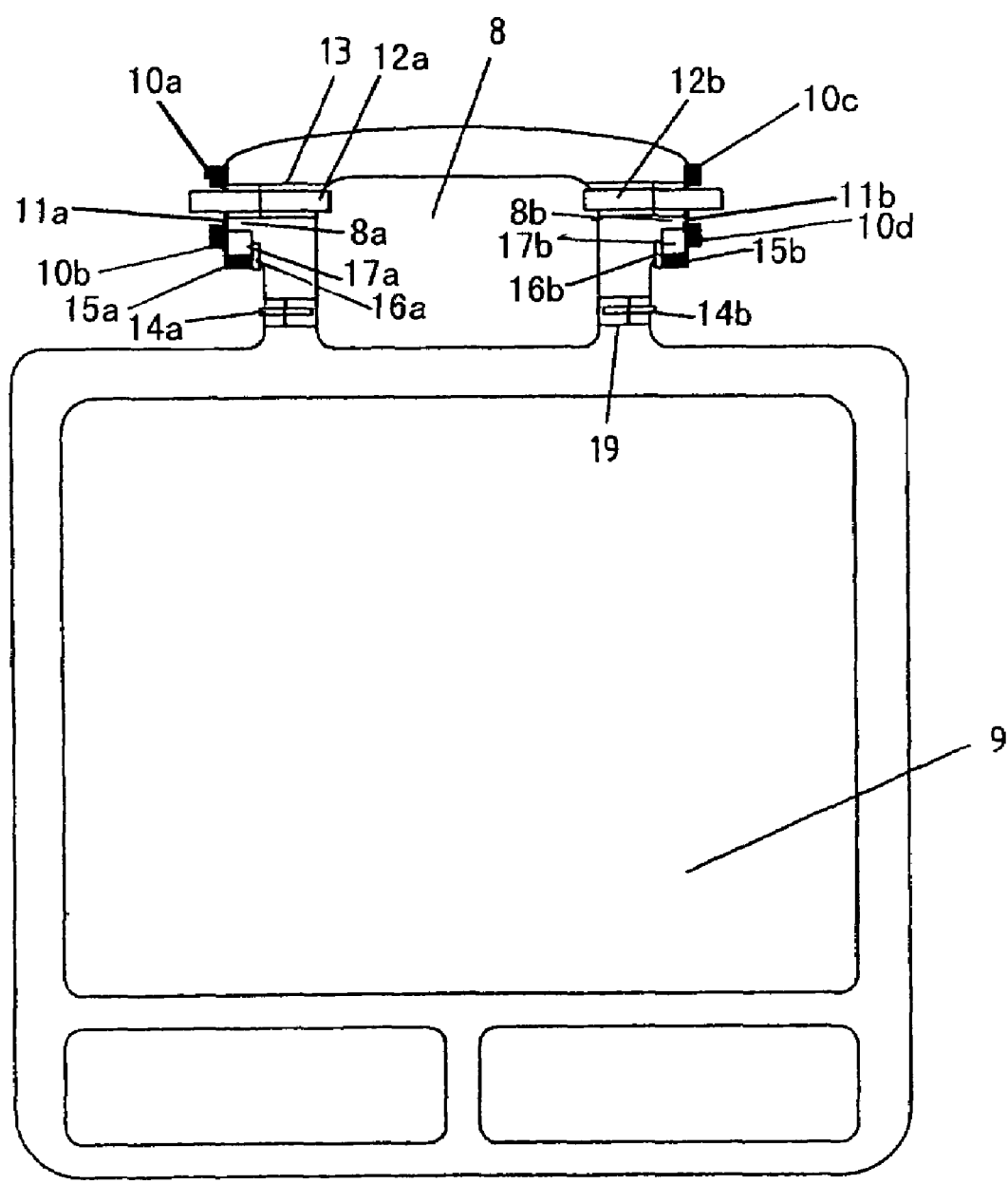
FIG. 2 is a schematic section view of the vehicle unit according to an embodiment of the present invention.

FIG. 2 is a schematic section view of the vehicle unit according to an embodiment of the present invention. Referring to FIG. 2, a vehicle unit comprises a compartment 9 and a magnetic levitation cabin 8 which is integrated with and located under the compartment 9. The magnetic levitation cabin 8 is formed with a first protrusion portion 8a at a first outer side (left side in FIG. 2) thereof, and a second protrusion portion 8b at a second outer side (right side in FIG. 2) opposed to the first outer side. A first magnetically conductive base 11a is fixed to an outer side of the first protrusion portion 8a, and a second magnetically conductive base 11b is fixed to an outer side of the second protrusion portion 8b. A first pair of balancing permanent magnets is mounted on the first magnetically conductive base 11a, and a second pair of balancing permanent magnets is mounted on the second magnetically conductive base 11b and symmetrical with the first pair of balancing permanent magnets. The first pair of balancing permanent magnets is comprised of a first upper balancing permanent magnet 10a and a first lower balancing permanent magnet 10b which is located beneath the first upper balancing permanent magnet 10a and has an opposite magnetic pole to that of the first upper balancing permanent magnet 10a. Similarly, the second pair of balancing permanent magnets is comprised of a second upper balancing permanent magnet 10c and a second lower balancing permanent magnet 10d which is located beneath the second upper balancing permanent magnet 10c and has an opposite magnetic pole to that of the second upper balancing permanent magnet 10c. The first upper balancing permanent magnet 10a is symmetrical with the second upper balancing permanent magnet 10c and the first lower balancing permanent magnet 10b is symmetrical with the second lower balancing permanent magnet 10d. A first guide wheel 12a is disposed between the first upper balancing permanent magnet 10a and first lower balancing permanent magnet 10b, and a second guide wheel 12b is disposed between the second upper balancing permanent magnet 10c and the second lower balancing permanent magnet 10d. In addition, the first and second 12a, 12b are mounted on a wheel beam 13. First and second auxiliary guide wheels 14a, 14b are disposed symmetrically at two sides of a lower portion of the magnetic levitation cabin 8 and fixed to wheel beams 19, respectively. A first wing magnet base 17a is fixed at the first outer side of the magnetic levitation cabin 8 and located under the first protrusion portion 8a, and a second wing magnet base 17b, which is symmetrical with the first wing magnet base 17a, is fixed at the second outer side of the magnetic levitation cabin 8 and located under the second protrusion portion 8b. A first wing magnet 15a is fixed to a bottom surface of the first wing magnet base 17a, and a first sliding shoe 16a is mounted between the first outer side of the magnetic levitation cabin 8 and the first wing magnet base 17a as well as the first wing magnet 15a. The first sliding shoe 16a is preferably extended downwardly beyond the first wing magnet 15a. Also, a second wing magnet 15b is fixed to a bottom surface of the second wing magnet base 17b, and a second sliding shoe 16b is mounted between the second outer side of the magnetic levitation cabin 8 and the second wing magnet base 17b as well as the second wing magnet 15b. The second sliding shoe 16b is preferably extended downwardly beyond the second wing magnet 15b. According to the embodiment of the present invention, the first and second wing magnets 15a, 15b and the first and second pairs of balancing permanent magnets are made of, but not limited to, NdFeB permanent magnetic material.

Figure 3:
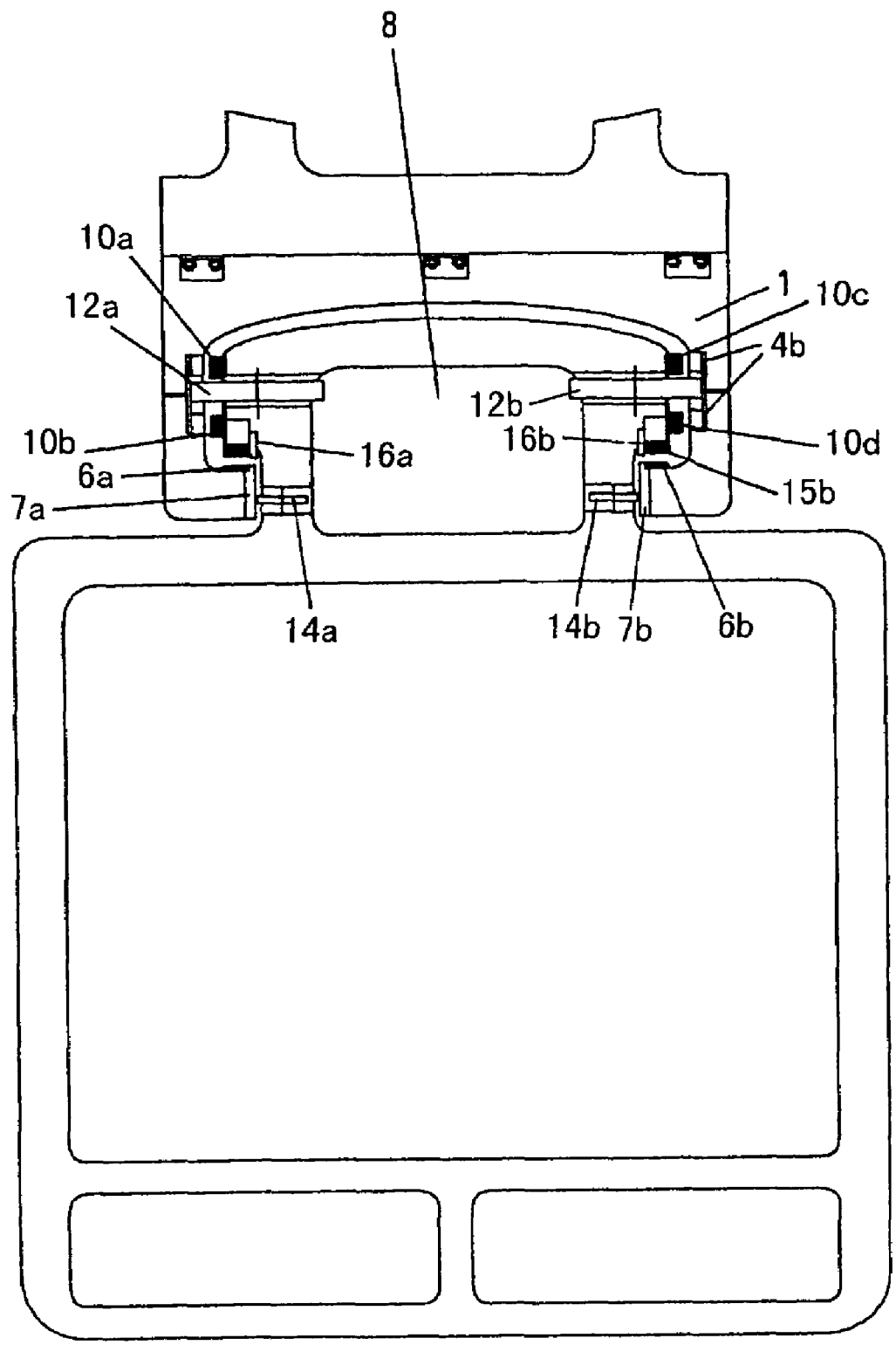
FIG. 3 is a schematic section view showing the engaging relationship between the suspending arch crosstie and vehicle unit according to an embodiment of the present invention.

FIG. 3 is a schematic section view showing the engaging relationship between the suspending arch crosstie and vehicle unit according to an embodiment of the present invention. Referring to FIG. 3, the magnetic levitation cabin 8 is levitated in the suspending arch crosstie 1. For the first and second pairs of balancing permanent magnets, the first lower balancing permanent magnet 10b has an opposite magnetic pole to that of the first upper balancing permanent magnet 10a, for example, if the first lower balancing permanent magnet 10b is N pole, the upper balancing permanent magnet 10a is S pole. Similarly, the second lower balancing permanent magnet 10d has an opposite magnetic pole to that of the second upper balancing permanent magnet 10c. The first and second pairs of balancing permanent magnets on two outer sides of the magnetic levitation cabin 8 correspond to the first and second balancing guide levitation rails 4a, 4b on two inner sides of the suspending arch crosstie 1, the first pair of balancing permanent magnets and the corresponding first balancing guide levitation rail 4a are spaced a gap of approximate 5 to 60 mm apart from each other, and the second pair of balancing permanent magnets and the corresponding second balancing guide levitation rail 4b are also spaced a gap of approximate 5 to 60 mm apart from each other. Balancing attraction forces are generated between the balancing permanent magnets and the corresponding balancing guide levitation rails so as to hold horizontally the magnetic levitation cabin 8 at the balancing position. The first wing magnet 15a corresponds to the first permanent magnetic rail 6a and is spaced a gap of approximate 2 to 60 mm apart from the first permanent magnetic rail 6a, and the second wing magnet 15b corresponds to the second permanent magnetic rail 6b and is spaced a gap of approximate 2 to 60 mm apart from the second permanent magnetic rail 6b. Upward levitation forces are generated between the wing magnets and the corresponding permanent magnetic rails so as to levitate the magnetic levitation cabin 8. Therefore, the magnetic levitation cabin 8 is held at the balancing position in a levitation state by dual action of the balancing attraction forces and the levitation forces, that is, the balancing attraction forces are used to compensate the levitation forces so as to hold the magnetic levitation cabin 8 at the balancing position in a levitation state. If the gap between the wing magnets and the corresponding permanent magnetic rails is less than 2 mm, the sliding shoes and the corresponding auxiliary guide rails contact with each other so as to prevent damage to the wing magnets and/or the permanent magnetic rails.

As described above, the first guide wheel 12a is disposed between the first upper balancing permanent magnet 10a and first lower balancing permanent magnet 10b, and supported centrally in the concave portion of the first balancing guide levitation rail 4a. Also the second guide wheel 12b is disposed between the second upper balancing permanent magnet 10c and the second lower balancing permanent magnet 10d, and supported centrally in the concave portion of the second balancing guide levitation rail 4b, so that the magnetic levitation cabin 8 is held centrally in the suspending arch crosstie 1.

The auxiliary guide wheels are spaced a gap of approximate 2 to 10 mm from the corresponding auxiliary guide rails, and may contact the corresponding auxiliary guide rails only when the vehicle unit swerves so as to reduce the running resistance and secure running safety.

The magnetic levitation train employed the suspending-rail permanent magnetic levitation system according to the present invention has the following advantages:

(1) the transport capacity is high and equivalent to about 6 times of that of the German TR series magnetic levitation train, and can be used for passenger transportation or cargo transportation;

(2) the cost is low and equivalent to $\frac{1}{10}$ times of that of the German TR series magnetic levitation train;

(3) the energy consumption is low and equivalent to 10% of that of the German TR series magnetic levitation train; and (4) the own weight of the train is light and equivalent to $\frac{1}{3}$ of that of the German TR series magnetic levitation train.

While preferred embodiments of the invention have been described and illustrated above, it should be understood that these are exemplary of the invention and are not to be considered as limitation. Additions, omissions, substitutions and other modifications can be made without departing from the sprit or scope of the present invention. Accordingly, the invention is not to be considered as being limited by the foregoing description, and is only limited by the scope of the appended claims and the equivalents thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A permanent magnetic levitation system, comprising:
   a track unit comprising:
   a beam used as a base;
   a suspending arch crosstie connected fixedly to a bottom of the beam and having first and second ends at an open side thereof;
   first and second balancing guide levitation rails which are disposed symmetrically in waist portions at inner sides of the suspending arch crosstie, made of ferromagnetic materials, and each have a concave cross-section, respectively;
   first and second permanent magnetic rails which are disposed on upper surfaces of the first and second ends of the suspending arch crosstie respectively; and
   first and second auxiliary guide rails which are disposed on end surfaces of the first and second ends respectively in which the end surface of the first end faces that of the second end; and
   a vehicle unit comprising:
   a compartment;
   a magnetic levitation cabin which is integrated with the compartment, has first and second outer sides opposed to each other, and is formed with first and second protrusion portions at the first and second outer sides respectively;
   first and second magnetically conductive bases which are fixed to outer sides of the first and second protrusion portions respectively;
   first and second pairs of balancing permanent magnets which are symmetrical, the first pair of balancing permanent magnets being fixed to the first magnetically conductive base and comprised of a first lower balancing permanent magnet and a first upper balancing permanent magnet located above the first lower balancing permanent magnet, the first lower and upper balancing permanent magnets having opposite magnetic poles to each other, and the second pair of balancing permanent magnets being fixed to the second magnetically conductive base and comprised of a second lower balancing permanent magnet and a second upper balancing permanent magnet located above the second lower balancing permanent magnet, the second lower and upper balancing permanent magnets having opposite magnetic poles to each other;
   first and second guide wheels, the first guide wheel being disposed between the first lower and upper balancing permanent magnets, and the second guide wheel being disposed between the second lower and upper balancing permanent magnets;
   first and second wing magnet bases which are disposed respectively on bottom surfaces of the first and second protrusion portions;
   first and second wing magnets which are disposed respectively on bottom surfaces of the first and second wing magnet bases;
   first and second sliding shoes, the first sliding shoe being disposed between the first wing magnet base and the first outer side of the magnetic levitation cabin, and the second sliding shoe being disposed between the second wing magnet base and the second outer side of the magnetic levitation cabin; and
   first and second auxiliary guide wheels which are symmetrically disposed between a lower portion of the magnetic levitation cabin and the compartment;
   wherein the magnetic levitation cabin is levitated in the suspending arch crosstie, the first pair of balancing permanent magnets correspond to the first balancing guide levitation rail and are spaced a gap of approximate 5 to 60 mm apart from the first balancing guide levitation rail, and the second pair of balancing permanent magnets correspond to the second balancing guide levitation rail and are spaced a gap of approximate 5 to 60 mm apart from the second balancing guide levitation rail;
   the first wing magnet corresponds to, and is located above and spaced a gap of approximate 2 to 60 mm apart from the first permanent magnetic rail, and the second wing magnet corresponds to, and is located above and spaced a gap of approximate 2 to 60 mm apart from the second permanent magnetic rail;
   the first and second guide wheels are respectively supported in concave portions of the first and second balancing guide levitation rails so as to control the vehicle unit to be positioned centrally in the suspending arch crosstie;
   the first and second auxiliary guide wheels correspond to and are spaced a gap of approximate 2 to 10 mm apart from the first and second auxiliary guide rails, respectively,
   thereby the vehicle unit is held in a levitation state at a balancing position by levitation repulsion forces generated respectively between the first and second wing magnets and the first and second permanent magnetic rails, and balancing attraction forces generated respectively between the first and second pairs of balancing permanent magnets and the first and second balancing guide levitation rails.

2. The permanent magnetic levitation system according to claim 1, wherein the first and second balancing guide levitation rails are respectively provided with reinforcing ribs at back surfaces thereof so as to reinforce their connections with the suspending arch crosstie.

3. The permanent magnetic levitation system according to claim 1, wherein when the gaps between the first wing magnet and the first permanent magnetic rail and/or between the second wing magnet and the second permanent magnetic rail is less than 2 mm, the first sliding shoe contacts the first auxiliary guide wheel and/or the second sliding shoe contacts the second auxiliary guide wheel so as to prevent damage to the first and/or the second wing magnets and the first and/or the second permanent magnetic rails.

4. The permanent magnetic levitation system according to claim 1, wherein during swerving of the vehicle unit, the first auxiliary guide wheel contacts first the auxiliary guide rail or the second auxiliary guide wheel contacts the second the auxiliary guide rail so as to reduce the running resistance and secure travel safety.

5. The permanent magnetic levitation system according to claim 1, wherein the first and second pairs of balancing permanent magnets, the first and second wing magnets and the first and second permanent magnetic rails are made of NdFeB permanent magnetic material, respectively.

* * * * *